May 17, 1960
W. M. WATKINS
2,937,036
HIGH TEMPERATURE TELESCOPIC JOINT WITH
HEAT INSULATING AND RADIATING MEANS
Filed Aug. 5, 1955
2 Sheets-Sheet 1
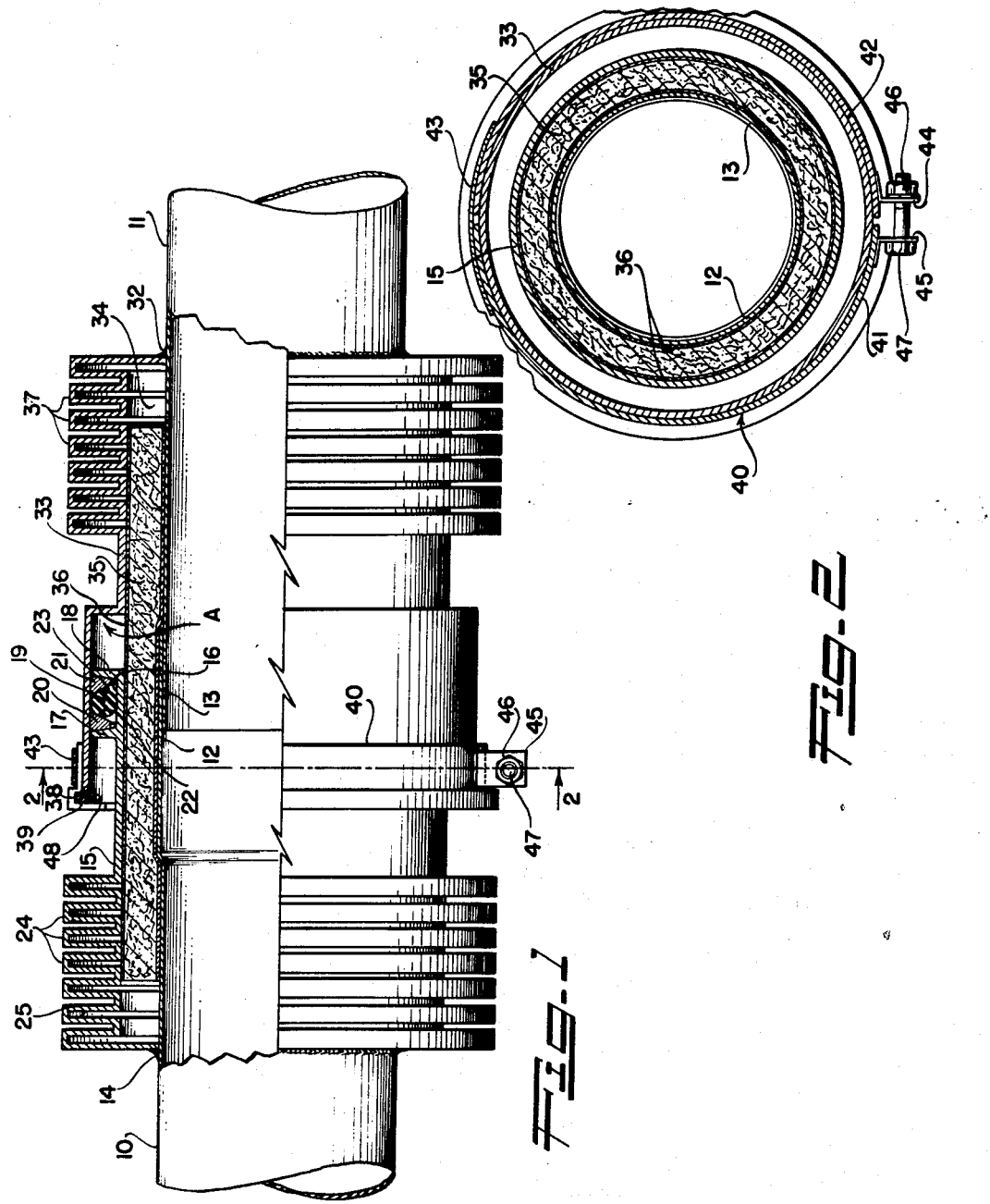
INVENTOR.
WILLIAM MACK WATKINS
BY
George C. Sullivan
Agent

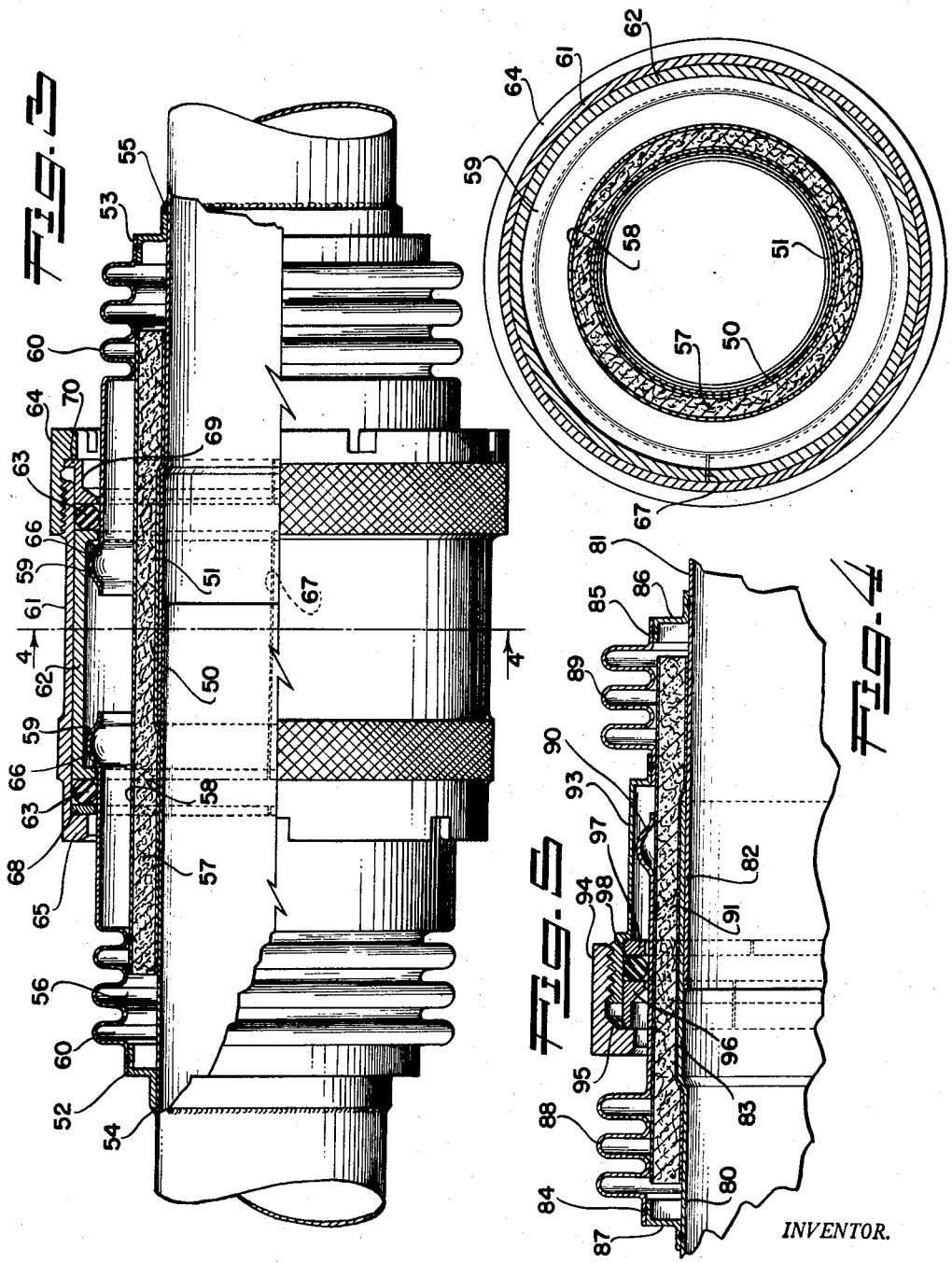

United States Patent Office 2,937,036
Patented May 17, 1960

2,937,036

HIGH TEMPERATURE TELESCOPIC JOINT WITH HEAT INSULATING AND RADIATING MEANS

William M. Watkins, Canoga Park, Calif., assignor to Lockheed Aircraft Corporation, Burbank, Calif.

Application August 5, 1955, Serial No. 526,726

3 Claims. (Cl. 285—41)

This invention relates to slip joints and, more particularly, to thermal resistant joints employed in high pressure hot air systems and the like.

In the aircraft industry, as well as other industries, ducting systems are employed for carrying a heated substance under pressure. For example, compressed air bled from turbo propulsive engines is under high pressure and reaches a temperature of 800° or higher. It has been a problem to provide a suitable joint for use in such a ducting system which affords an efficient and dependable means of sealing which is not subject to fatigue or wear failures under conditions of angular or longitudinal movement at high temperatures and/or high pressures.

In the past, metal bands have been constricted around the joint to effect coupling but this has proven to be inflexible due to the friction present between parts and furthermore the metal bands provide poor coupling due to the inefficient sealing. Another conventional joint employs a simple bellows in the ducting system for absorbing deflection and thermal expansion. This means has proven ineffective due to the fact that the absence of internal support requires that some external support be added to prevent the bellows from expanding laterally when high pressure is applied. Using external lateral supports is undesirable because of added weight and bulkiness. Generally, any deflection of the bellows induces high stresses which often result in rupturing the joint or if continued over a period of time produces fatigue failure. Also, high velocity internal air flows tend to vibrate the bellows which often causes fatigue failure.

Because of the necessity for high sealing efficiency and flexibility, it is desirable to employ a resilient sealing means such as rings of rubber, synthetic rubber, and the like, compressed against the joined ducts or tubes. The use of this type of seal is advantageous because in a compressed state, the seal is resilient enough to maintain effective sealing even though longitudinal or torsional deflections are applied to the joint. But, generally, any temperatures encountered in excess of the sealing means temperature limits renders the seal's use impractical.

These difficulties are overcome in the present invention in which there is provided a pair of telescopic ducts or tubes carrying heat radiating means arranged to engage when the ducts are coupled. An annular space is located between the heat radiating means and the ducts for receiving a thermal resistance means employed to resist heat transfer from a hot substance carried within the duct system. A resilient sealing means is employed between the heat radiating means and the thermal resistance means which allows the joint flexibility and efficient sealing. Since the thermal resistance means limits the rate of heat transfer from the high temperature substance in the ducting system, the resilient sealing means is thereby protected and does not structurally break down or oxidize. The heat radiating means provides an extended heat path over which convective heat may be dissipated into the atmosphere and thereby affords further protection for the sealing means.

In one embodiment of the present invention a pair of annular members is affixed to each tube of the joint which carries a set of fin members. The fin members are hollow in order to provide maximum surface area to atmosphere contact for efficient dissipation of heat transferred via the annular members from the tubes and also to provide maximum heat path length to facilitate a large temperature drop. Located between the sets of fin members is an annular synthetic rubber seal commonly referred to as an O ring. Since such a seal is subject to breakdown when exposed to high temperatures, a fiber glass mat is arranged between the seal and the tubes which, in cooperation with the fin members, minimizes the transfer of heat from the substance carried in the tubes to the seal.

It is to be noted that in some applications, lengthening of the heat paths by means of the fin members alone is adequate for protecting the seal.

It is a general object of this invention to provide a simple, practical and dependable slip joint adapted to be employed in high pressure, high temperature ducting systems.

Another object of the present invention is to provide a means of thermal insulation and dissipation which will protect the slip joint from breakdown.

Another object of this invention is to provide suitable means to absorb structural deflections and thermal expansion of the ducting system and at the same time to possess lateral rigidity to counteract or resist lateral movement.

Another object of the present invention is to provide a flexible slip joint that is light in weight and does not require weighted structural means for lateral support to counteract forces exerted by the high pressure within the ducting system.

Other objects and features of this invention will become apparent from the following detailed description as illustrated in the accompanying drawings in which:

Figure 1 is a longitudinal detailed sectional view of a slip joint in accordance with the present invention with the end portions appearing in side elevation;

Figure 2 is a sectional end view taken along line 2—2 of Figure 1;

Figure 3 is a longitudinal detailed sectional view of another embodiment of the present invention employing beaded tubular joint construction;

Figure 4 is a sectional end view taken along line 4—4 of Figure 3; and

Figure 5 is a fragmentary view in section of another embodiment of the present invention.

Referring to Figures 1 and 2 showing a slip joint employing the present invention, there is shown a pair of ducts or tube sections 10 and 11 arranged with their end portions 12 and 13 in sliding telescopic engagement for carrying air at high pressures and high temperatures. It should be noted, however, that the slip joint may also be employed in other substance carrying systems, such as a fluid system. Section 10 has secured thereto, as by a weld 14, a tubular or annular member 15 which extends radially outward from the weld and then axially in spaced surrounding relation to the telescoping end portions of the tubes. Member 15 has an external annular groove 16 defined by angular wall sections 17 and 18 which extend circumferentially about member 15. A resilient sealing means 19 is carried within groove 16 and extends slightly above the wall sections when not compressed.

The resilient sealing means is preferably cylindrical in cross section and may be composed of silicon rubber or similar resilient material that is unaffected by the substances to be handled and that retains its characteristics of flexibility and resiliency throughout a wide range of temperatures. A pair of annular back-up rings 20 and 21, having angled faces 22 and 23 are fitted between the sealing means and each wall section respectively.

The exterior of member 15 has a multiplicity of spaced heat radiating fins 24 co-extensive with its exterior. While the fins 24 are shown as extending in the circumferential direction they may be constructed to extend axially or longitudinally of the joint. Each fin may be constructed to form a solid metal fin but preferably is shown having an interior space 25 which provides an extended heat path from the tubes to the sealing means for exposing more metal to the atmosphere for efficient dissipation of accumulated heat.

Tube section 11 has secured thereto, by a weld 32, an annular member 33 which extends outwardly or radially from the weld and then axially to engage sealing means 19 carried by member 15. The longitudinal and axially extending portions of member 33 and member 15 are spaced around the tubes 10 and 11 forming a space 34 therebetween which is filled with a high temperature insulating material, such as a fiber glass mat 35 enclosed in fiber glass cloth 36. The external regions of member 33 which are free and clear of the member 15 are provided with spaced heat radiating fins such as fins 37. Fins 37 may extend circumferentially, as shown, or may extend longitudinally as desired. The end portion of the member 33 is provided with an annular flange 38 which is received by a groove 39 provided in a collar 40 and thereby encloses sealing means 19 and cooperates therewith to provide an airtight seal.

Collar 40 comprises a pair of rigid semi-circular members 41 and 42 joined together at one end by a flexible metal band 43. A pair of flanges 44 and 45 is provided on the ends opposite of the flexible band 43 which is adapted to receive a nut 46 and screw 47. Upon activating the nut and screw, annular flange 38 engages groove 39 and collar 40 is constricted about member 33. Collar 40 is provided with an internal annular shoulder or flange 48 forming a stop or abutment for cooperating with wall section 17. The internal diameter of this flange is less than the external diameter of wall sections 17 and 18 so that the semi-circular members must be spread apart in order to be mounted on member 33.

Relative longitudinal movement may occur between flange 38 and that outwardly or radially extending portion of member 33 represented by point A. During such relative movement, sealing means 19 is in constant contact with the interior of member 33 and the exterior of member 15.

It has been found that by isolating sealing means 19 from tubes 10 and 11 by the layer of insulation 35 and by providing an extended heat path by means of the fins 24 and 37 from the tube sections to the sealing means, the sealing means 19 will remain at a temperature within the safe operating temperature limit of the sealing means material. Since the sealing means is resilient, longitudinal and/or torsional movement will not allow leakage or produce structural weakness.

In actual operation, employing the device of Figures 1 and 2, fiber glass mat 35 is placed between annular member 15 and end portion 12 of tube section 10. The end portion 12 of the tube 11 is slipped into space 34 between annular member 33 and tube section 11.

Sealing means 19 and the pair of back-up rings 20 and 21 are fitted into groove 16 provided in annular member 15. As the tubes are moved relative to one another, the free end of member 33 carried by tube section 11 is slid over the wall portions of member 15 so that back-up rings 20 and 21 are forced to compress sealing means 19 against the exterior of member 15 to seal chamber 16 from passing any substance carried by the tube sections. Groove 39 of collar 40 is slipped into engagement with flange 38. Tightening of nut 46 and screw 47 causes collar 40 to constrict about member 33.

A slip joint constructed in this manner provides that heat transferred from the hot substance carried within the tube sections be resisted by the fiber glass mat 35 enclosed in the fiber glass cloth 36. Heat appearing on the tube sections near the ends of the mat is transferred or conducted via welds 14 and 32 associated with members 15 and 33 to heat radiating fins 24 and 37 respectively. Heat conducted through the fins is dissipated into the surrounding atmosphere. By providing the high temperature resistance mat and an extended heat path in the form of heat radiating fins, the sealing means is adequately protected from high temperature within the tube sections 10 and 11.

In another embodiment of the present invention as shown in Figures 3 and 4, a joint is provided which will accommodate torsional movements and thermal expansion without losing effective sealing. As shown, a pair of tube sections 50 and 51 are slidably and telescopically engaged. Each tube section carries an annular member 52 and 53 respectively which are welded to the tube sections 50 and 51 represented by numerals 54 and 55. The annular members extend radially outward from the welds and then project longitudinally toward one another to have their major portions in spaced surrounding relation to the tubes. An annular space 56 thus provided is occupied by a heat resistant mat 57 similar to the mat 35 employed in the embodiment of Figures 1 and 2 enclosed in temperature resistant material 58. In accordance with usual practice, beads 59 are provided to engage the means for coupling the tubes together and present curved external surfaces which are uniform in configuration throughout their circumference.

Annular members 52 and 53 are provided further on their exterior with a multiplicity of spaced heat radiating fins 60 adjacent portions of heat resistance mat 57. The fins may take the form of corrugations spirally formed or may be a series of hollow fins surrounding the mat and tube sections. The main importance of the fins is to provide an extended heat path from the welds 54 and 55 so that heat may be dissipated when induced from the tube sections.

The means for coupling the tubes together may be said to comprise, generally, a coupling body 61, a split load assuming sleeve or collar 62 for cooperation with the beads 59 of the two tubes, sealing means 63 for sealing between the internal surface of the body 61 and the external surfaces of the annular members and a threaded external collar or nut 64 associated with the coupling body 61.

Coupling body 61 is a tubular member designed and proportioned to be readily slid or arranged around or over the members 52 and 53 and their beads 59. One end of collar 62 has an internal annular shoulder or flange 66 forming a stop or abutment for the internal elements of the coupling. The internal diameter of this flange 66 is less than the external diameter of the beads 59 so that the flange does not interfere with the positioning of body 61 on the tubing assembly. The end of body 61 provided with the flange 65 may be slightly enlarged in external diameter, the opposite end portion of the body being provided with the externally arranged nut 64.

The sleeve or collar 62 performs the function of assuming the end loads imposed on the coupling by the internal substance pressures in the tubing system as well as such loads imposed in other manners. The collar 62 is contained within the tubular coupling body 61 and cooperates with beads 59 associated with members 52 and 53. The collar 62 is an annular or tubular element having a substantially cylindrical periphery adapted to bear on the internal surface of the coupling body 61. Spaced internal annular shoulders or flanges 66 are provided on the collar 62 to engage with the beads 59. These flanges 66, which may preferably be integral with the collar 62 are preferably at the ends of the collar, as illustrated. The inner and outer radial sides or surfaces of the flanges 66 are preferably flat and occupy planes substantially normal to the central longitudinal axis of the coupling assembly. The inner corner of one flange 66 cooperates with the outer side or face of one bead 59 while the inner corner of the other flange 66 engages with the outer side of the other bead 59. In order to facilitate the assembling of the coupling and to allow the sleeve or collar 62 to conform to body 61 during elastic deformation thereof the collar is split longitudinally as at 67. The split collar is sufficiently yieldable or flexible to be readily sprung over the members 52 and 53 and their beads 59. Thereafter, the coupling body 61 is slid over the collar 62 to restrain the collar against subsequent displacement so that the flanges 66 are retained in place to cooperate with their respective beads 59.

The sealing means 63 are provided adjacent the coupling body 61 at each end of the sleeve or collar 62 and serve to prevent the passage of substance under pressure from between the body 61 and the external surfaces of the major portions of the annular members 52 and 53. In accordance with the broader aspects of the invention any appropriate type or form of packing or sealing means may be employed, such as square or rectangular sealing rings, chevron type seals, etc. As shown, the sealing means is in the form of what is generally referred to as O rings. These rings are similar to the sealing means shown in Figures 1 and 2 and likewise may be formed of rubber, synthetic rubber, rubber composition, appropriate plastic, or the like, having the selected or required hardness, resiliency, flexibility and other physical characteristics and are circular or round in transverse cross section. One sealing means 63 is arranged within the body 61 between the flange 66 of the collar 62 and a washer 68 engaged against the internal stop shoulder 65 of the body. Washer 68 serves to prevent excessive distortion or extrusion of the sealing means and is sectional or split to be readily sprung over the adjacent or related beads 59. The other sealing means 63 is positioned in the body 61 between the other collar flange 66 and an angular washer 69. Washer 69 is engaged or retained by the nut 64.

The sealing means 63 are proportioned to be under initial light compression between the internal surface of the body 61 and the external surfaces of the annular members 52 and 53. In this manner, the substance under pressure usually acts to maintain effective surface compression and actuation of the sealing means. If necessary, the nut 64 may be utilized to exert actual compression on the sealing means if this is desired and found necessary.

Nut 64 is threaded or screwed on one end portion of the tubular coupling body 61 and has a flange or internal lip 70 extending inwardly toward the related annular member 53 beyond the end of the coupling body. The circular or annular lip 70 of the nut 64 cooperates with the adjacent washer 69. By threading or tightening nut 64 on body 61 the two sealing rings 63 are simultaneously and substantially uniformly compressed between their related washers 68 and 69 and the end flanges 66 of the collar 62.

The operation of the joint illustrated in Figures 3 and 4 is substantially the same as for the joint shown in Figures 1 and 2 with the exception that two sealing means are employed and the tube sections are coupled together by a conventional coupling device comprising body 61 engageable with nut 64 to compress the sealing means 63 against collar 62.

The device shown in Figure 5 is similar to the joint of Figures 1 and 2 inasmuch as a pair of tube sections 80 and 81 are arranged with their end portions 82 and 83 in sliding telescopic engagement and each tube section carries an annular member 84 and 85 extending radially outward about the tube sections and joined thereto by means of rings 86 and 87. Also, the members carry a multiplicity of fin members 88 and 89 substantially as described about in order to provide an extended heat path. Annular member 84 is provided at its end opposite to ring 87 with a bead 90 extending circumferentially about the engaging tube sections. Slidably located between annular member 84 and end portions 82 and 83 is a heat insulation mat 91 similar to the mat employed in the above embodiments.

Welded to annular member 85 on its end opposite to ring 86 is an annular coupling body 93 adapted to pass over the bead 90 and to engage a nut 94. Nut 94 has an integrally formed flange or abutment 95 surrounding member 84. Within the interior of coupling body 93 and abutment 95, there is located a sealing arrangement comprising an angular back-up ring 96 engageable with abutment 95, a rectangular back-up ring 97 held in place by coupling body 93, and a resilient sealing means 98 compressible between the back-up rings. The sealing means may be composed of substantially the same composition as described and employed in the above embodiments.

During operation nut 94 may be tightened on coupling body 93 to compress the sealing arrangement against the exterior surface of member 84. Relative longitudinal movement is provided within the limits of engagement of back-up ring 97 with bead 90 or the engagement of the radially outward extending portion of member 93 with member 85 at the weld joining the coupling body.

A feature resides in the embodiment of Figure 5 which provides a means for controlling the pressure applied to compress sealing means 98 by either tightening or loosening nut 94. Also, the over-all length of the coupling is reduced to a minimum which is weight and space saving.

As described above, much difficulty has been encountered in maintaining efficient sealing in earlier couplings of this general class due to compositional or structural breakdown of the sealing means when exposed to high temperature. This difficulty is overcome in the devices shown in the figures by isolating or insulating the sealing means from high temperature of the substance carried in the ducting system in combination with the heat radiating fins dispersed about the entire joint. Since temperature drop is a function of conducting area and length the fins are useful in reducing heat traveling from the substance via the annular members by effectively dissipating it before reaching the sealing means carried by the annular members.

Having described only typical forms of the invention, I do not wish to be limited to the specific details herein set forth, but wish to reserve to myself any variations or modifications that may appear to those skilled in the art and fall within the scope of the following claims.

I claim:
1. A joint for use in a ducting system carrying substance under pressure and relatively high temperature comprising, in combination, a pair of tubes having end portions arranged in sliding telescopic engagement for conveying the substance, an annular member carried by each tube, each of said annular members secured to its respective tube along a circumference axially displaced from said end portions, said annular members extending axially in radially spaced surrounding relation to the respective tubes toward said end portions so that an uninterrupted annular space is provided between each annular member and the related tube extending from the area of securement of said annular member to said related tube to the end of said annular member corresponding to the end of said related tube, a heat resistant mat circumferentially disposed about the telescopically engaged portions of said tubes and extending into said annular spaces, resilient sealing means having a lower resistance to heat than the heat resistant mat circumferentially disposed about the mat and the telescopically engaged end portions of the tubes, each annular member including means adapted to receive said sealing means in sealing relation and a corrugated portion comprising a plurality of spaced rigid corrugations disposed between the area of securement of said annular member to its tube and the area of engagement of said annular member with said sealing means, said corrugated portion of each of said annular members disposed adjacent the area of securement of said annular member to its tube and extending over the respective end of said heat resistant mat, whereby a prolonged conductive heat path is interposed between the tubes and the sealing means, said end portion of said tubes being relatively dimensioned and fitted to prevent convective flow of said substance into said annular space.

2. A joint for use in a ducting system carrying substance under pressure and relatively high temperature as in claim 1 and wherein said corrugated portion of each of said annular members is disposed in closely spaced relation to said heat resistant mat to minimize convective fluid flow therebetween.

3. A joint for use in a ducting system carrying substance under pressure and relatively high temperature comprising, in combination, a pair of tubes having end portions arranged in sliding telescopic engagement for conveying the substance, a heat resistant mat circumferentially disposed about the telescopically engaged portions of said tubes, an annular member carried by each tube, each of said annular members secured to its respective tube along a circumference axially displaced from the end portion thereof and beyond the respective edge of said mat, said annular members extending axially in radially spaced surrounding relation to the respective tubes and mat toward said end portions so that an uninterrupted annular space is provided between each annular member and the related tube extending from the area of securement of said annular member to said related tube to the end of said annular member corresponding to the end of said related tube, each annular member including a corrugated portion commencing adjacent the area of securement of said annular member to its tube and extending over the respective end of said mat, said corrugated portion comprising a plurality of spaced rigid annular corrugations, the remaining portion of each of said annular members disposed over said heat resistant mat in axially spaced surrounding relation thereto, and sealing means including resilient sealing means circumferentially disposed about said mat and engaging both of said portions of said annular members disposed over said mat in sealing relation, said end portion of said tubes, said annular space and said heat resisting mat being relatively dimensional and fitted to prevent convective flow of said substance in said annular space, whereby a prolonged conductive heat path is interposed between the tubes and the sealing means.

References Cited in the file of this patent

UNITED STATES PATENTS

| | | |
|---|---|---|
| 1,535,209 | Dubbs | Apr. 28, 1925 |
| 2,103,981 | Hall | Dec. 28, 1937 |
| 2,127,073 | Topping | Aug. 16, 1938 |
| 2,438,312 | Bunn et al. | Mar. 23, 1948 |
| 2,479,104 | Dreyer | Aug. 16, 1949 |
| 2,485,370 | Dreyer | Nov. 18, 1949 |
| 2,520,501 | Guiler et al. | Aug. 29, 1950 |
| 2,685,166 | Hasbrouck et al. | Aug. 3, 1954 |

FOREIGN PATENTS

| | | |
|---|---|---|
| 398,488 | France | Mar. 24, 1909 |
| 637,122 | Great Britain | May 10, 1950 |
| 675,935 | Great Britain | July 16, 1952 |
| 72,396 | Netherlands | May 15, 1953 |